United States Patent
Smalley et al.

[19]

[11] Patent Number: 6,067,549

[45] Date of Patent: May 23, 2000

[54] SYSTEM FOR MANAGING REGULATED ENTITIES

[75] Inventors: Donald A. Smalley, St. Paul, Minn.; Todd Fein, Arlington, Va.; Jeffrey Gerber, McLean, Va.; Gary Singer, Arlington, Va.

[73] Assignee: American Management Systems, Inc., Fairfax, Va.

[21] Appl. No.: 09/209,282

[22] Filed: Dec. 11, 1998

[51] Int. Cl.[7] .................................................. G06F 17/30
[52] U.S. Cl. ............................... 707/104; 707/10; 705/1; 705/7; 705/28
[58] Field of Search ........................ 707/9, 10; 705/2–4, 705/8, 7, 1, 11, 9, 28; 345/329, 331–332

[56] References Cited

U.S. PATENT DOCUMENTS

| | | | |
|---|---|---|---|
| 5,532,928 | 7/1996 | Stanczyk et al. | 364/406 |
| 5,664,112 | 9/1997 | Sturgeon et al. | 705/28 |
| 5,726,884 | 3/1998 | Sturgeon et al. | 395/209 |
| 5,765,140 | 6/1998 | Knudson et al. | 705/9 |
| 5,793,636 | 8/1998 | Cooney et al. | 364/479.01 |
| 5,808,916 | 9/1998 | Orr et al. | 395/500.27 |
| 5,890,129 | 3/1999 | Spurgeon | 705/4 |

OTHER PUBLICATIONS

"Grant Application & Management System—Version 6.01.95" North Carolina State University, pp. 12–29, Jun. 1995.

*Primary Examiner*—Hosain T. Alam
*Attorney, Agent, or Firm*—Staas & Halsey LLP

[57] ABSTRACT

A regulatory agency with the responsibility of administering regulations uses a system with joint-usage capabilities, including data about regulated entities that are subject to the laws and rules administered by the agency and software for accessing the data. The joint-usage capabilities are preferably used by all subdivisions or departments of the agency that have similar functions or administer regulations on the same regulated entities. Variations in the ways that the departments administer regulations are handled two ways. First, each regulated entity may have several subject items defined in the joint-usage data with each subject item related to the regulations that a single department administers. Thus, if two departments are responsible for a single regulated entity, each may create one or more subject items in the joint-usage data describing the regulated objects, activities, or other aspects of that regulated entity. Second, when one department's regulations require storage of data that is inconsistent with how the majority of departments administer their regulations, department- or program-specific capabilities are used to store the program-specific data. The system merges the program-specific data with the joint-usage data, so that the users have a seamless view of the data related to administering regulations applicable to the regulated entities. This enables the regulatory agency to produce "multimedia" permits, inspections and enforcement orders. The system is flexible enough to be used equally as well by separated program areas.

19 Claims, 8 Drawing Sheets

SYSTEM FOR MANAGING REGULATED ENTITIES

BACKGROUND OF THE INVENTION

1. Field of the Invention

The present invention is directed to a system for managing regulated entities using a database of information on the regulated entities and, more particularly, to a system for administering environmental protection laws and regulations using a database system architecture having integrated data management.

2. Description of the Related Art

In today's society, there are many government regulatory agencies at the federal, state and local levels. One of the most complex areas of regulation is environmental protection, where numerous laws have been passed and regulations promulgated affecting many kinds of activities of individuals and organizations.

Historically, environmental regulatory agencies have been organized into units that implement separate and distinct regulatory programs, e.g., air pollution control, surface water pollution control, hazardous waste disposal control, etc. In most agencies, each of these program offices has been responsible for meeting its own data management needs, including maintaining information describing each of its regulated entities and each of its regulatory activities, e.g., developing permits, conducting site inspections, and taking enforcement actions with respect to the regulated entities.

Most environmental agencies have not established standards for data system design, thereby allowing program-specific data systems to be created entirely independently of each other, often without any reference to data management methods used elsewhere in the agency. Similar situations can be found in other types of regulatory agencies. One of the results of this splintering of responsibility for data management is that insufficient funds and technical expertise necessary for sophisticated systems have been applied to data management at regulatory agencies, resulting in a patchwork of databases developed and maintained by staff who are not computer professionals. This situation in turn severely hampers the ability of agencies to establish and enforce cross-program consistency in policies and work processes, and it makes it very difficult to assemble all available information on a regulated entity.

SUMMARY OF THE INVENTION

It is an object of the present invention to reduce the time and effort for a regulatory agency to issue permits and licenses, determine compliance and take enforcement action against violators.

It is another object of the present invention to facilitate production of permits and other regulatory actions that encompass multiple program areas or regulations all affecting a single regulated entity, such as a refinery or municipal solid waste landfill.

It is a further object of the present invention to provide timely and accurate responses to information requests by reducing the time and effort required to determine the status of a permit or enforcement action in response to inquiries from an applicant, other governmental employees, or the public.

It is yet another object of the present invention to reduce data collection efforts by regulatory agencies and the regulated community.

It is a yet further object of the present invention to increase the speed and accuracy of data analysis and reports across program areas within a regulatory agency, including access to program-specific data by agency staff in other program offices.

The above objects can be attained by a system using a database structure, embodied on at least one computer accessible medium, to manage information on regulated entities, the database structure comprising a primary level identifying regulated entities, optionally associable with a geographic location, and a secondary data level identifying subject items of the regulated entities subject to regulation. The information on the regulated entities is managed by creating a joint-usage database having this database structure; adding permit data to the joint-usage database by referencing at least one of the subject items for one of the regulated entities, so that a permit can be generated for the at least one of the subject items; adding operational data to the joint-usage database with reference to the at least one of the subject items for the one of the regulated entities, where the operational data is obtained from monitoring reports of operation of the at least one of the subject items; and accessing the joint-usage database when necessary to enforce the permit.

To maximize flexibility, some data may be stored in program-specific tables separate from the joint-usage database, each program-specific table supplementing the information in the joint-usage database with information related to only a single program area. The program-specific tables do not contain any general information describing a regulated entity or any other information inconsistent with the information stored in the joint-usage database. When program-specific information is created for a regulated entity, the software that displays the information about the regulated entity to a user automatically accesses the program-specific tables and displays data related to the regulated entity that is stored in the program-specific tables and the joint-usage database.

In addition to the data describing regulated entities and subject items, the joint-usage database includes a requirements library specifying standard regulatory requirements applicable to the regulated entities and cross reference records relating characteristics of the subject items to the requirements in the requirements library. The requirements library is used to automatically generate a draft permit after a user has specified the subject items to be included in the permit. The requirements identified by the cross reference records for a permit are stored in a used requirements table from which a report is generated as the permit. The used requirements table can contain requirement identifiers used to access the text of the requirements in the requirements library, or the actual text of the requirements.

Inspection checklists are automatically generated from checklist language stored in the requirements library. Like the requirements text in the permits, the checklist language can be obtained using the requirement identifiers. Inspections performed using the inspection checklists are one source of operational data of the subject items' operation. Other reports obtained by monitoring the operation of the subject items, including reports produced by persons associated with the regulated entities, provide additional operational data, all of which is stored in the joint-usage database or, if necessary, one or more of the program-specific tables. A regulated entity's compliance with its permit can then be determined using the information stored in the joint-usage database and program-specific tables.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 5–7 are examples of a display screen produced by a method or system according to the present invention.

FIGS. 9–10 are examples of display screens produced by a method or system according to the present invention.

DESCRIPTION OF THE PREFERRED EMBODIMENTS

Figure 1:
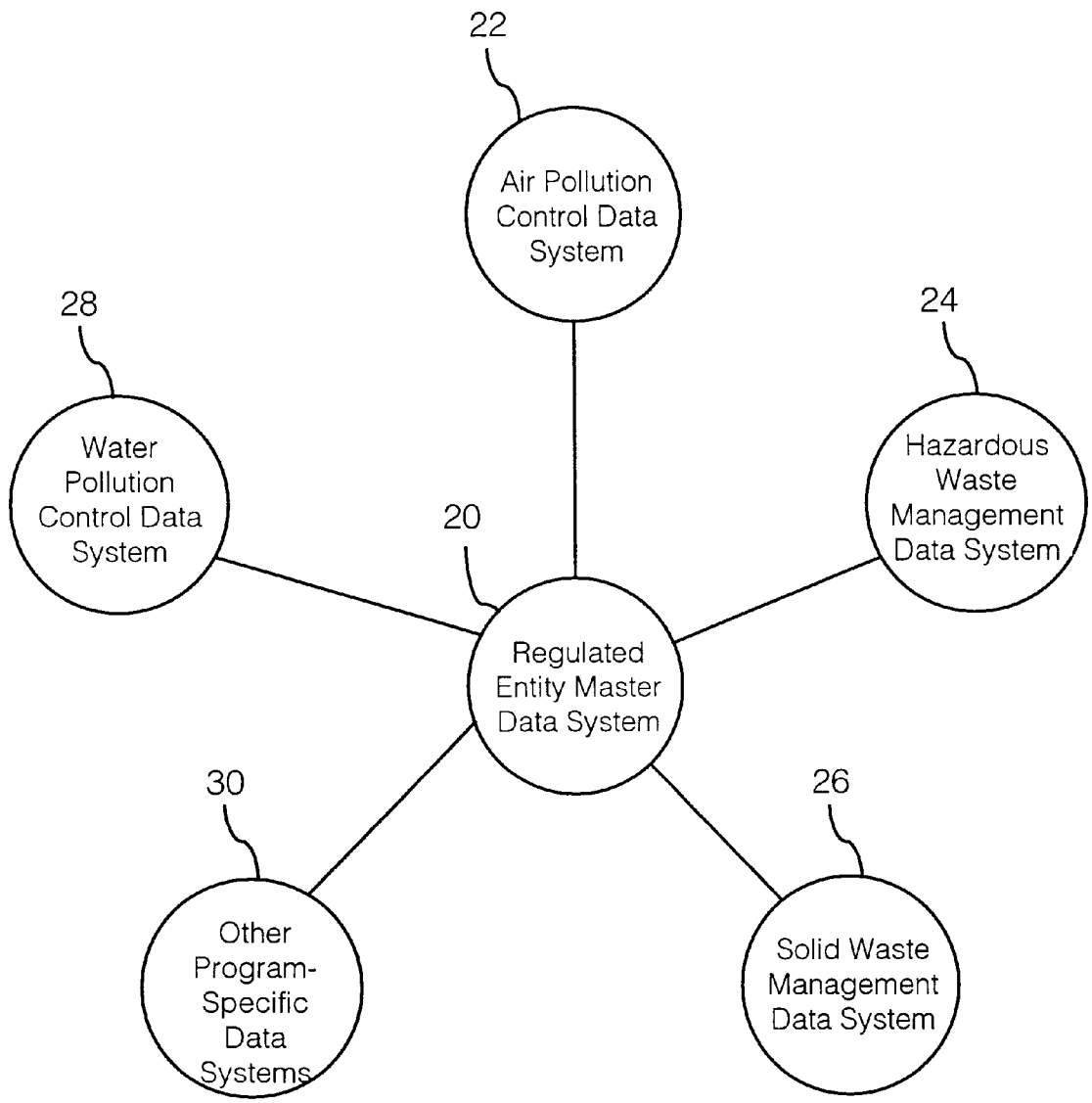
FIG. 1 is a block diagram of a conventional database for storing information used in environmental regulation.

Many types of regulatory agencies perform three major work functions that are the essence of governmental regulation in most fields: requirement setting, compliance monitoring, and enforcement. The description of the preferred embodiment will refer primarily to environmental regulation, which is particularly complex due to the pollution control technologies involved and the multitude of laws, rules and jurisdictions. However, the data management problems addressed by the present invention are not confined to environmental agencies.

To emphasize the applicability to other types of regulation, several generic terms will be used extensively in the description of the preferred embodiment. A "regulated entity" is a distinct location, or an individual or organization operating without a fixed location, that is subject to regulations constraining its behavior. In the arena of environmental regulation, a regulated entity may be, for example: a factory of any kind; an electricity-generating power plant; a wastewater treatment plant; a dry cleaning establishment; an oil or natural gas pipeline; a hazardous waste transportation company; or a pesticide applicator business. A "program interest" is a regulated entity when viewed from the regulatory perspective of a single environmental regulatory program. For example, a factory and a wastewater treatment plant on the same property are two "program interests" of the same regulated entity—the factory is of regulatory interest to the air pollution control program (and perhaps others as well), and the treatment plant is of regulatory interest to the water pollution control program. The term "subject item" refers to a specific piece of equipment, process, or other activity or behavior that is subject to a distinct set of regulatory requirements. In the arena of environmental regulation, examples of subject items are: a boiler; an incinerator; a reactor; a wastewater discharge pipe; a storage tank; a solid waste recycling operation; a hazardous waste hauling operation; and a pesticide applicator business. In the case of the last three examples, the "subject item" is often coincident with the entire "regulated entity," i.e., the regulated entity comprises just one subject item—the single regulated activity in which the entity is engaged.

Some regulatory agencies issue "permits" to persons responsible for the behavior of a regulated entity. A permit is a document that states the individual "requirements," or conditions of operation, with which the regulated entity must comply. In some regulatory settings, a different term is used for such requirements-stating documents, including "license," "authorization," or "approval". In the environmental arena, permits are typically issued to impose requirements governing air pollution, water pollution, hazardous waste disposal, and solid waste disposal. Some other regulatory programs do not issue permits; instead, general requirements applicable to all regulated entities are published in administrative regulations.

Regulatory agencies employ one or more methods to monitor the compliance of regulated entities with applicable requirements. An "inspection" is a visit by agency personnel to a regulated entity's location for purposes of verifying compliance. Regulated entities may also be required to send to the agency various kinds of "submittals," such as reports and sample analyses, containing information that can be used to verify compliance without a site visit. Other methods of compliance determination also may be used. The agency may consider a regulated entity's failure to comply with an applicable requirement to be a "violation" of that requirement.

When one or more violations are discovered, agency personnel may issue an "enforcement order" to the responsible parties to compel compliance with the violated requirement(s). The order to comply is contained in a legal document that states the violated requirement(s), the corrective action required, the deadline for compliance, and in certain cases an economic penalty assessed by the agency.

Chief among the several functions of environmental regulatory agencies is the promulgation and enforcement of requirements governing behaviors that can have a harmful impact on ecological or human health. In this sphere of their operations, environmental regulatory agencies typically have been organized into separate organizational units to address the distinct challenges of air pollution control, water pollution control, hazardous waste disposal, solid waste (e.g., garbage) disposal, and so on. These general areas are often called "media," though this is a misnomer in the case of hazardous and solid waste, for which the polluted "medium" is generally land and/or ground water. The agency jurisdiction responsible for regulating environmental impacts in one of these areas is called a "program". For example, air pollution control regulations are developed and implemented by the "air program".

Within an environmental regulatory program, the duties of agency personnel center on three major functions: imposing requirements on environmentally-risky activities; monitoring compliance with those requirements; and taking legal enforcement actions to compel violators to comply. The present invention provides automated data management support for these three basic tasks. Such a system can support the regulatory activities of any or all environmental programs in an agency. Preferably, a system according to the present invention also enables multimedia integration of data, where the term "multimedia" is used to mean multiple environmental regulatory programs. The primary intent of multimedia data integration is to provide comprehensive information regarding the agency's activities with respect to a single pollution source that is regulated under more than one program.

Integrated Regulated Entity Data Management Systems

During the 1990s, mounting pressure for more efficient and effective government prompted environmental agencies to improve their use of computer systems in the performance of permitting, compliance monitoring, and enforcement functions. Several agencies have turned to state-of-the-art electronic technologies and relational database architectures to achieve three major objectives: (1) reduce the time and effort required to produce permits, perform compliance verifications, and prepare enforcement action against violators; (2) improve communication and consistency between the requirement-setting function (e.g., permit writing) and the compliance monitoring and enforcement functions within a given regulatory program (e.g., air, water, etc.) which are often performed by separate organizational units; and (3) increase the speed and accuracy of multimedia data analysis and reporting—e.g., producing data retrievals that draw from program-specific data resources to assemble "the full picture" on an entity that is regulated under two or more programs.

These objectives have been difficult and expensive to achieve, mainly because of the differences in database structures and nomenclatures used by the regulatory programs in their separate data systems, which sometimes also operate in incompatible technical environments. A major obstacle is that different programs often use different names and identification numbers for the same regulated entity. To overcome these problems, some agencies have undertaken an across-the-board reworking of all of their capabilities for managing data pertaining to regulated entities to make cross-program integration of data more achievable. A vital element of such an "integrated regulated entity management system" is a centralized master database of regulated entities, defining each entity uniquely for the agency and establishing links to related data in the pertinent program-specific database(s). Also in such a system, the data systems supporting the permitting, compliance monitoring, and enforcement functions of each regulatory program are modified or reconstructed to provide better support for all of the objectives described above.

In some agencies, the regulated entity database has been implemented as a stand-alone reference file, not connected electronically to the program-specific systems where the detailed data on regulated entities is stored. Other agencies have made their regulated entity database a central, shared utility that functions as an online module of each program-specific system, which provides a strong incentive for keeping its data and cross-references up to date.

The earliest known attempt by an environmental regulation agency to create an integrated regulated entity management system employing a shared regulated entity database operating in tight integration with program-specific databases resulted in a system as illustrated in FIG. 1 for the Minnesota Pollution Control Agency (MPCA) in the mid-1990s. As illustrated in FIG. 1, a regulated entity master file system 20 was interconnected electronically with four different program area systems: an air pollution control data system 22, a hazardous waste management data system 24, a solid waste management data system 26, and a water pollution control data system 28. The possibility existed for other program-specific systems 30 to be added in the future. The regulated entity master file system 20 stored the agency's only editable ("master") version of basic identification data describing each regulated entity, including name, location, and ownership data. This joint-usage database also referenced which of the four program-specific databases contained additional, "non-master" information pertaining to a given regulated entity—i.e., the agency's one or more "program interests" for that entity. Each program-specific system contained its own database of program-specific data, software to access that program-specific data, and software to retrieve the master identification data from the regulated entity master file system 20 whenever this shared data was to be displayed on a program-specific data screen or report. As a result, the program interest records defined by personnel responsible for each program area were separate and irreconcilable, resulting in a lack of integration below the site location level.

The program areas in the MPCA system were integrated only in that they shared use of the data in the regulated entity master file system 20. The highest data level in the regulated entity master file system 20 was a site identifier that corresponded to a geographic location. The secondary level in the master file was a program interest identifier with a program interest type, i.e., air, water, solid waste, or hazardous waste. When adding a new program interest to a program-specific database, a user needed to determine whether the corresponding site had already been defined in the master file and, if so, add the new program interest cross-reference to the already-existing site definition record. One of the drawbacks of the database structure of the prior art regulated entity master file system 20 is that only site information was shared; there was a lack of integration of program interests. Since there was no sharing of program interest data, the database structure was not designed to require that each regulated entity was defined uniquely. Another of the drawbacks is that the database structure of the prior art regulated entity master file system 20 was designed to deal with regulated entities that have a fixed geographic site. Regulated entities without a fixed site of operation (e.g., waste transporters) could be accommodated only by creating spurious fixed-location data for them.

Figure 2:
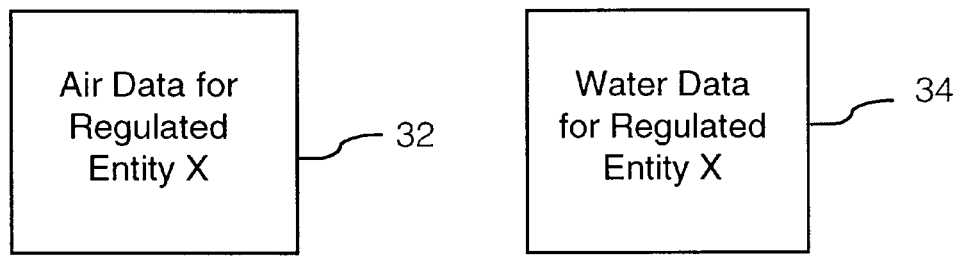
FIG. 2 is a conceptual file diagram of a prior art regulated entity master data system.

A conceptual view of the organization of regulated entity data in the MPCA system is illustrated in FIG. 2. Each program regulating a given regulated entity essentially maintained physically separate filing cabinets containing its program-specific data pertaining to the regulated entities. A user of the Air system could navigate easily to any other Air filing cabinet but could not access any filing cabinet for a different program, since those cabinets were contained in physically separate database systems accessible only to the staff of those program areas. Thus, a person using the Air data system could examine the contents of the "Air" filing cabinet 32 for a regulated entity, but could not examine the contents of a "Water" filing cabinet 34 for the same regulated entity.

Multimedia Treatment of Regulated Entities

During the second half of the 1990s, environmental regulatory agencies have begun to move toward a new approach to managing their regulated entities. Under the traditional approach, a regulated entity that is subject to the requirements of more than one regulatory program receives separate treatment from each of the organizational units responsible for those programs; separate permits are issued, separate inspections are conducted, and separate enforcement actions are taken when violations are discovered. Under the emerging new approach, agencies are seeking to take a holistic view of a regulated entity, consolidating the previously separate program-specific activities into comprehensive multi-program, or multimedia, regulatory efforts. In this approach, a regulated entity may receive only one permit containing, for example, all applicable air emission and wastewater discharge requirements, instead of a separate and unrelated permit for each type of pollution. Similarly, multimedia field inspections may be conducted, and multimedia enforcement actions may be pursued. The advantages of this approach to regulation include more efficient use of staff resources and more optimal control of all of the pollution outputs from a site.

State environmental agencies have begun to reorganize themselves to better execute the multimedia approach, moving away from the traditional program-specific divisional structure, which produced fragmented, uncoordinated, and often inefficient regulation of large, complex regulated entities. They are adopting instead an organizational structure in which there is a single permitting division and a single compliance/enforcement division. This consolidation of previously-separate, program-specific functions into a single organizational unit brings with it the desire to standardize work processes and policies so that a single, consistent regulatory approach may be brought to bear on any given regulated entity. An important consequence of this drive for consistency and efficiency is the desire to have a single set of data management tools that everyone can use to support their common mission, rather than the conventional situation in which each program division had its own data management tools, with little or no standardization among them.

The present invention organizes and provides access to regulated entity information and fully accommodates the multimedia approach, while also supporting a program-specific approach where appropriate, either in combination with or instead of the multimedia approach. Data management systems designed according to the present invention provide robust support for the way many regulatory agencies will be doing business during the coming decade. Prior art systems, represented by the MPCA system described above, were designed to support the traditional way of doing business and cannot be readily or economically adapted to support the full multimedia paradigm.

Regulated Entity Management System

Figure 3:
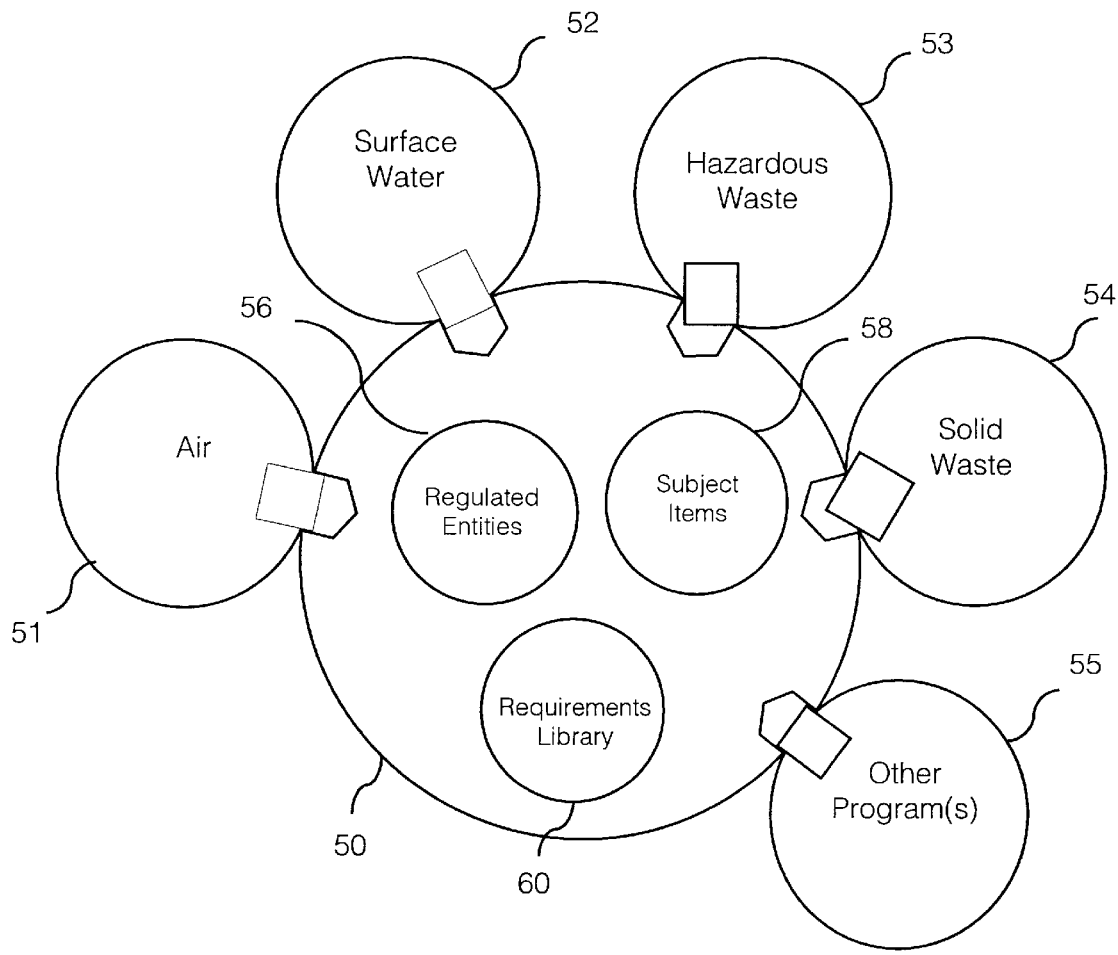
FIG. 3 is a block diagram of software and data tables in a system according to the present invention.

There are several differences between the database structure and user interface software of a system according to the present invention, as illustrated in FIG. 3, and the database structure and interface software of the prior art system illustrated in FIG. 1. With reference to FIG. 3, much more of the data management capabilities in a system according to the present invention are handled by software and data tables that are implemented just once and shared by all users, regardless of their regulatory program. In the prior art system illustrated in FIG. 1, only the regulated entity master file system 20 was a shared component of the overall complex of systems and databases. Each of the program-specific systems 22–30 comprised all of the software and data tables necessary for self-contained operation, except for the regulated entity master file system 20. This was achieved through implementation of similar, but not identical, user interface screens and data structures in each of the program-specific systems 22–30.

Figure 4:
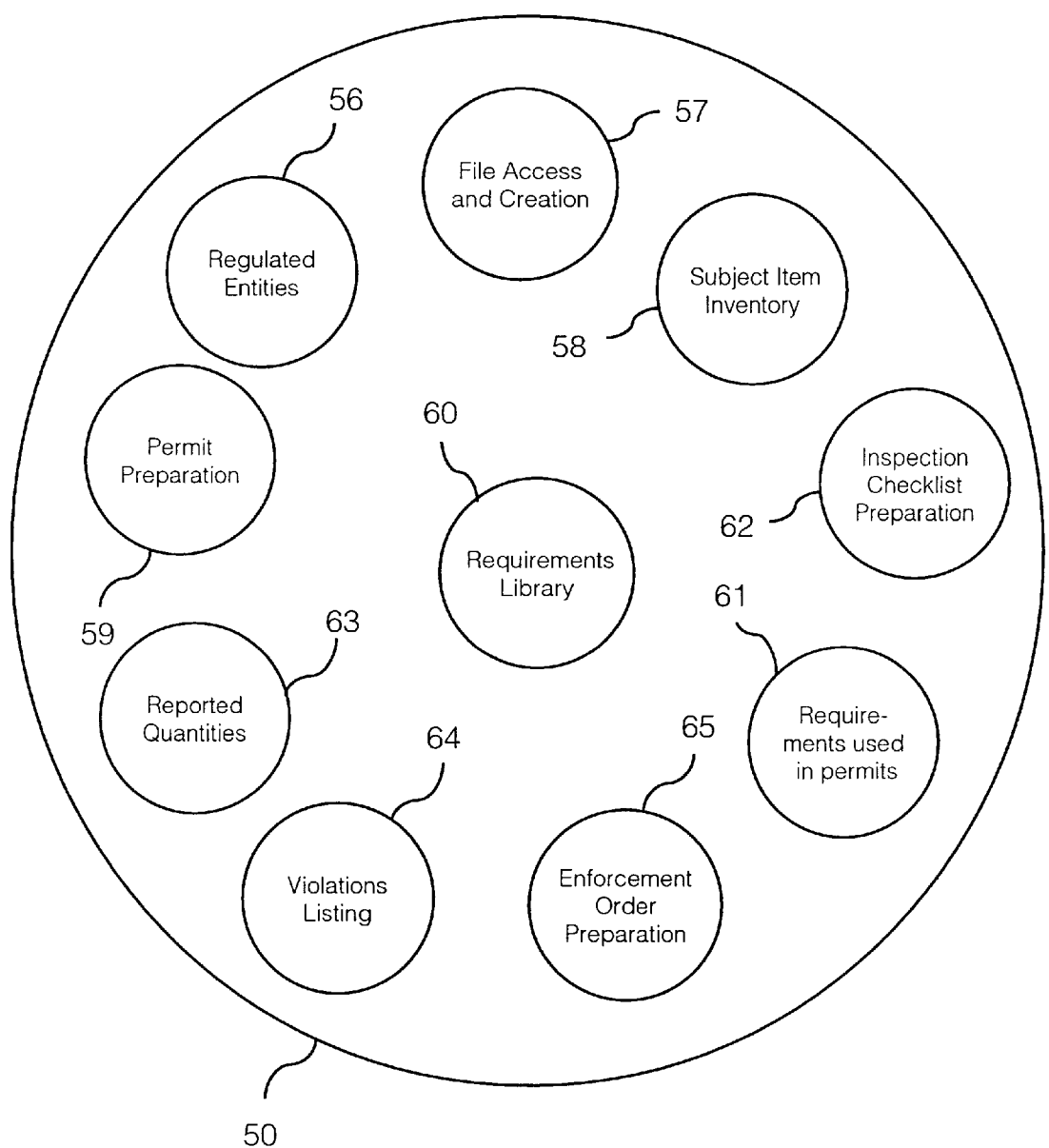
FIG. 4 is a more detailed diagram of the joint-usage component of the data and software illustrated in FIG. 3.
Figure 11:
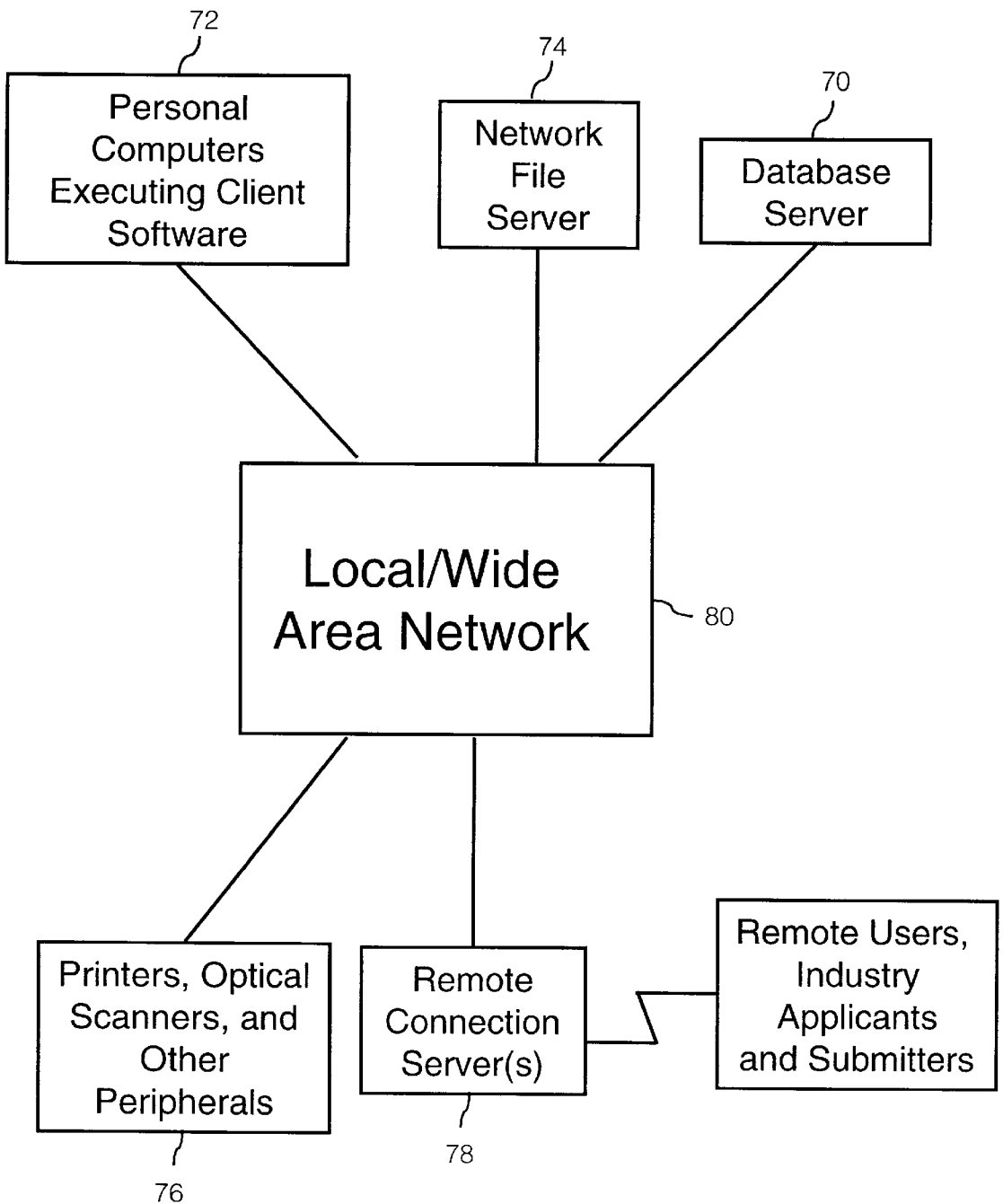
FIG. 11 is a block diagram of hardware in a system according to the present invention.

In a system according to the present invention, all of the interface software and data tables that support similar business functions performed by multiple regulatory programs are contained in the centralized joint-usage component 50. This greatly expanded complement of shared software and data tables includes, in addition to the features of the regulated entity master file system 20, joint-usage capabilities for definition and description of the subject items comprising a regulated entity; data file creation and access; work activity scheduling and tracking; permit development; creation of inspection checklists and recording of inspection results; data entry of sample analysis results from environmental monitoring; automated determination of exceedances of pollution limits; automated determination of delinquent submittals and actions; preparation of enforcement documents; fee assessment; and billing. FIG. 3 depicts a few of these categories of joint-usage capabilities 50 as a circle representing both the database structure for storing the associated data and the user interface screens and processing routines that are used to interact with that portion of the joint-usage database. Additional categories of capabilities are illustrated in FIG. 4, as described below.

It is not practical to serve all data management needs by means of the joint-usage features 50. Each regulatory program has some data types and processing requirements that are unique to that program. A system according to the present invention must therefore allow for the existence of program-specific capabilities, as under the prior art. However, with the present invention program-specific data structures, interface screens, and data processing routines are a much smaller proportion of the whole. In terms of the illustrative diagrams, roughly two-thirds of the contents of each program-specific system 22–30 in FIG. 1 is included in the joint-usage capabilities 50 component of FIG. 3, leaving behind only the truly unique program-specific features.

For example, the data management needs of an air pollution control program can be met by augmenting the large set of joint-usage features 50 with a comparatively small set of program-specific features 51, which might contain: (1) two or three program-specific screens used to enter and display program-specific data on facility operations and emissions, typically provided in permit applications; (2) provisions for entering program-specific descriptive data for the subject items at an air permittee's facility; (3) one or more screens for data entry and record keeping on field tests of pollution control equipment and/or emissions monitoring systems; and (4) standard data retrievals addressing air-specific information needs.

FIG. 3 represents such program-specific feature sets 51–55 as closely coupled to the joint-usage component, instead of detached and connected by thin lines as in FIG. 1. This reflects the preferable implementation of a system according to the present invention, in which the program-specific portions are not implemented as stand-alone, self-contained database applications as in the prior art 22–30. The multi-program database system resulting from the present invention is preferably a single software application used by all of the agency's regulatory programs. All users log onto the same system. An individual regulatory program's suite of data management tools is a transparent combination of that regulatory program's unique tools, e.g., the Air program features 51, and the joint-usage features 50 used by that program.

A system implemented according to the present invention incorporates several specific innovations that will differentiate such a system from the prior art. Most of these enhancements, described below, enable a system to support the multimedia regulatory approach in addition to, or instead of, the compartmentalized, program-specific approach that has historically been used by regulatory agencies.

Definition of Regulated Entities, With or Without a Fixed Site

A system according to the present invention provides capabilities for maintaining shared master data defining each agency-regulated entity uniquely across all program areas. The prior database structure for regulated entity identification data, represented by the MPCA systems described earlier, used geographic location, or "site", as the highest-level logical construct. In effect, a regulated entity was equated with a property or other physical location. The system required a site description record to be defined first, including data on street address and/or geographic coordinates (e.g., latitude and longitude). Only then could program interest records be defined and related to the site record, providing a cross-reference of the respective agency programs that regulate some aspect of the activities occurring at that site, but not ensuring the uniqueness of each regulated entity defined in the database.

This mandatory hierarchical relationship between geographic locations and regulatory interests is cumbersome when the environmentally-risky activities being regulated do not have a single fixed site, as for example with hazardous waste transportation or petroleum pipeline operation. In these cases, the commercial enterprise is generally considered to be the regulated entity, and the regulations apply to its activities at any of the many locations where it may operate. In the prior art system, these "non-site" regulated entities were accommodated by creating a site record that specified a largely irrelevant fixed location, e.g., the street address of the company's business office.

Under the present invention, the database structure for regulated entity definition is more flexible. The highest logical level is a non-locational description of the regulated entity, consisting of little more than an agency-unique identification number and an agency-standard name. Data describing a physical location may be entered as an optional attribute of the regulated entity when appropriate. For example, the regulated entity may be a fixed operation or an occurrence having a single geographic location associated therewith. On the other hand, the regulated entity may be a mobile operation that changes geographic location periodically, or an organization responsible for transport of potentially hazardous materials, either in vehicles or conduits, across a geographic area. Data records defining the agency's specific regulatory interests in the entity are then associated with the regulated entity identification record and may be displayed on a screen like that illustrated in FIG. 5. However, the concept of "program interests" as an intermediate construct linking regulated entities to their program-specific subject items is rendered obsolete as discussed below.

Accessing Data Pertaining to a Regulated Entity

Regulated entity data management systems based on either the prior art or the present invention employ a paper-filing metaphor to organize most data for intuitive user access. Data is viewed by the user in electronic forms (screens), retrieval layouts, or word processing files. A set of data contained in such an on-screen display constitutes a "document". Most documents contain data that pertains to one agency work activity—such as a permitting action, an inspection, or an enforcement case—undertaken with respect to one regulated entity. All documents pertaining to the same work activity are contained, conceptually, in a "folder" labeled with information uniquely identifying that work activity. Thus, for example, a folder for a permitting activity for a given regulated entity will typically contain separate documents that, when opened on the user's computer screen, display the permit application data, the workflow tracking data, the permit requirements data, and letters and other correspondence (word processing files) prepared during the permitting process. The set of all work activity folders pertaining to a single regulated entity can be thought of as the contents of a filing cabinet "drawer" for that entity.

Figure 8:
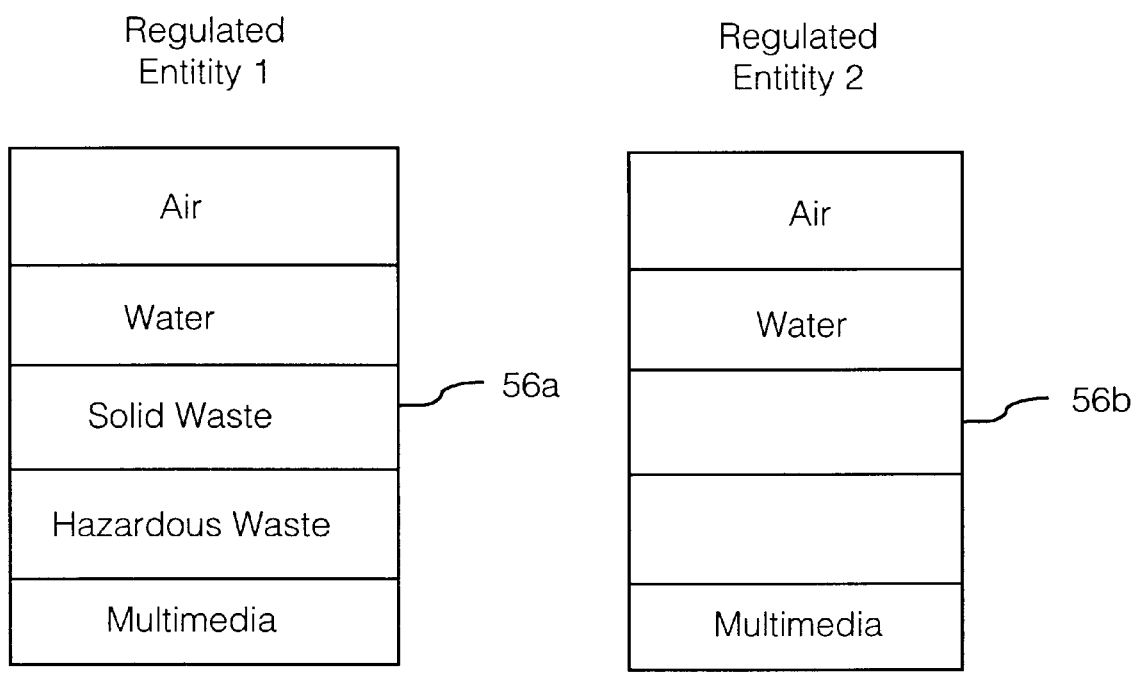
FIG. 8 is a conceptual file diagram of a system according to the present invention.
Figures 5, 6:
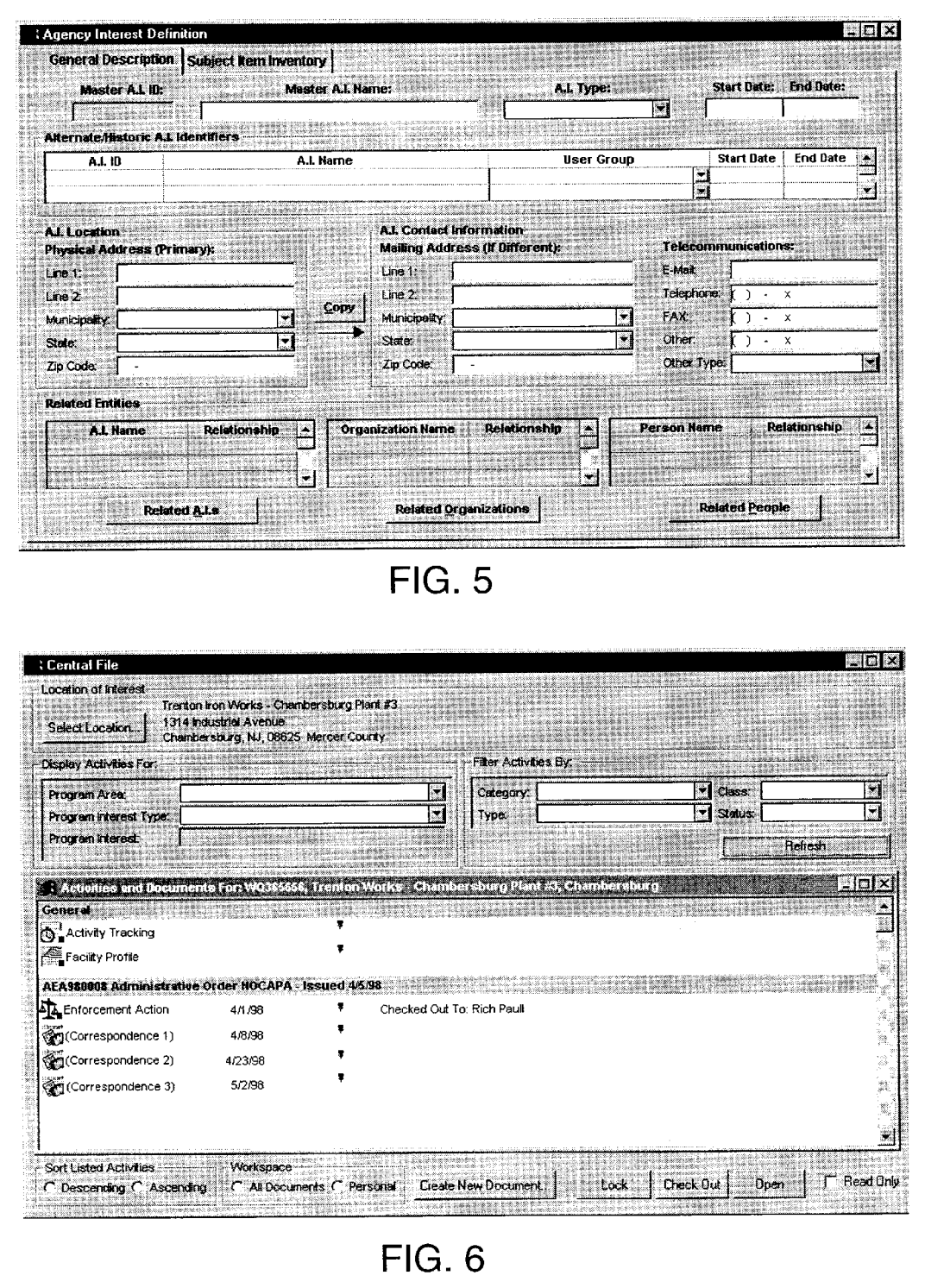

A file access screen provides the mechanism for examining the contents of this filing system and opening individual documents to view or update them. In an exemplary embodiment, a display screen like that illustrated in FIG. 6 provides file access. Initially, the data displayed on the screen illustrated in FIG. 6 would be blank. To retrieve a document via this screen, the user selects the button "Select Location" to cause display of a screen like that illustrated in FIG. 7 and then the user enters the regulated entity of interest by entering some or all of its name or its identification number. The system searches data in regulated entity master file system 20 (in the prior art system) or regulated entities 56 (according to the present invention, as illustrated in FIGS. 3 and 8) to determine whether a regulated entity is known to the agency. One way of making this determination is to find regulated entities corresponding to an identifier entered by a user. If more than one regulated entity matches the search criteria, a list of the matches is presented and the user must select the one desired based on the full name and address provided. If no regulated entity is found in the master file, the user cannot continue until the regulated entity, presumably new to the agency, has been established in the master file.

Once the appropriate regulated entity has been selected, the system then lists the work activity folders that have been created for that regulated entity, incorporating all activities for all of the agency's regulatory programs, e.g., using a display screen like that illustrated in FIG. 6. The user locates the folder for the desired work activity and accesses a list of the documents that have been created for that work activity, e.g., by "clicking" on the corresponding line in the list. The user then finds the appropriate document of interest within that list and clicks on the corresponding line to open the document for display. To display a document, the user does not have to be affiliated with the regulatory program that performed, or is performing, the work activity selected; however, a user typically is prevented from changing or entering data in documents created outside of his or her organizational unit.

The file access screen preferably contains several capabilities designed to help a user find a document rapidly. For example, once the list of activities and documents for a regulated entity has been retrieved and displayed on a screen like that illustrated in FIG. 6, the user may choose to narrow the list to include only the activities for a specified regulatory program, or only permitting activities, or only activities that have not been completed, e.g., by entering data in the "Filter Activities By" section. A combination of these and other criteria can also be used. The user can also have the document list sorted by date, document title, or other factors to facilitate finding a particular document of interest.

The file access screen also contains a mechanism by which the user may create a new folder, representing a newly-begun or planned work activity, or create a new document to receive data pertaining to an existing activity. For example, a display screen like that illustrated in FIG. 9 preferably appears when the user clicks on the button "Create New Document . . . " on the file access screen illustrated in FIG. 6. To add a new document to an existing activity folder, the user first specifies the activity by entering its descriptors in the secondary screen. The system then presents a list of document templates appropriate for the specified activity, as determined from a database table that cross-references document templates to activity types. A template is a master version of a document type from which a copy is made each time a specific document instance is created. For example, a word processing file may be used as a template for producing form letters. The user selects the desired document template from the list, and when the secondary screen is closed, the system automatically creates a new instance of the selected document type and creates its listing under the activity folder's heading in the file access screen.

Templates are used for the system's data entry screens as well as for word processing documents. The data entry screens are essentially computer-based forms, and as such they have templates from which the system generates an instance of an empty electronic form. For example, the main activity tracking screen for each work activity is generated from a single activity tracking screen template, ensuring that all instances of these activity tracking "forms" have an identical layout.

Figures 7, 9:
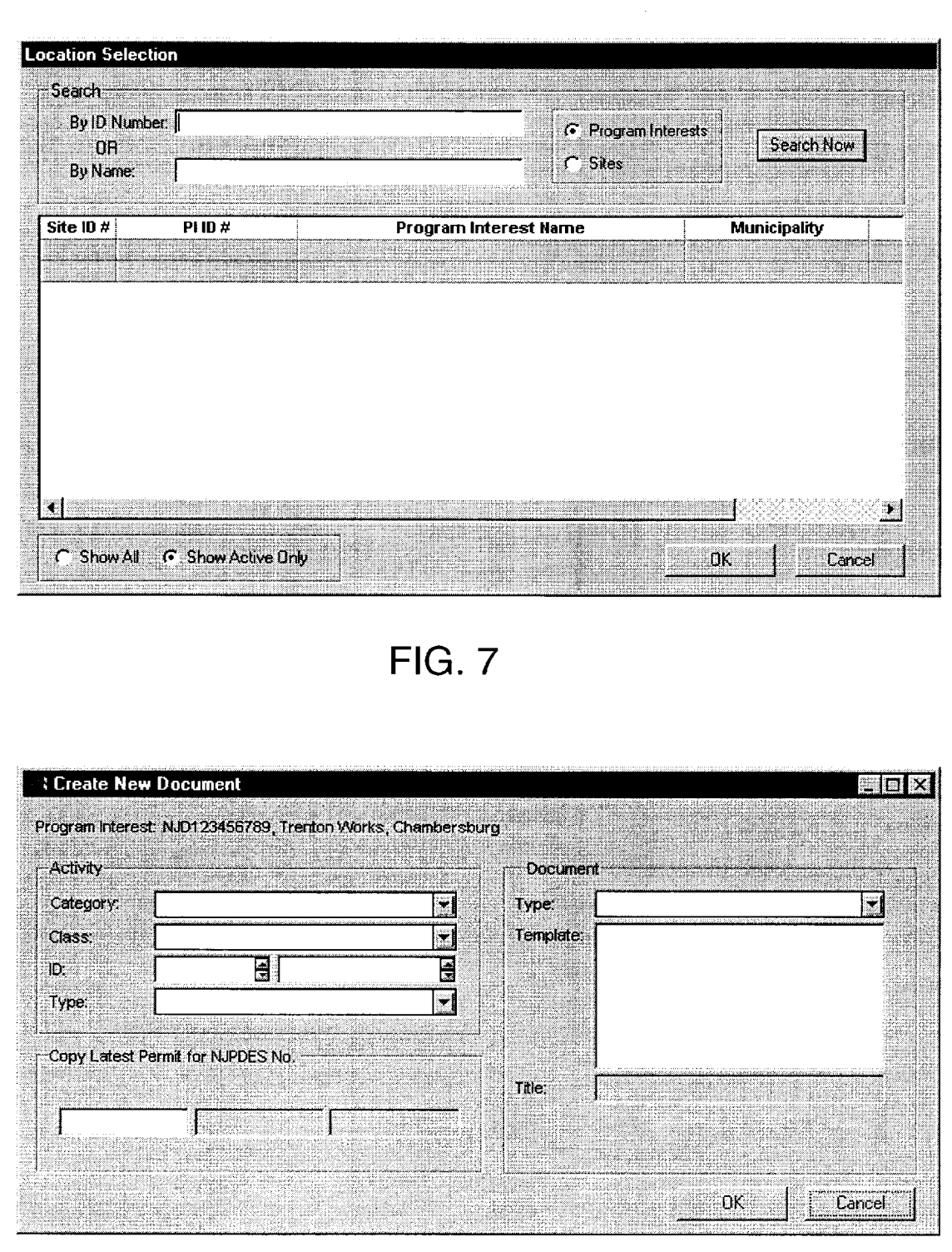

To add a new activity to the filing cabinet, the user designates in the "Create New Document" screen illustrated in FIG. 9, that a new activity is desired, rather than entering data specifying an existing activity. Then the user selects an initial document type from the list of document templates that are appropriate for the activity type of the new activity. When the "Create New Document" screen is closed, the system automatically creates the listing for the new work activity folder and its initial document in the file access screen.

The file access and creation mechanism 57 in the joint-access capabilities 50 illustrated in FIG. 4 for a system according to the present invention differs from that of the prior art. In the prior art system described above, the file access screen is implemented in each of the program-specific systems 22–30, providing a user access interface confined to the contents of the program-specific database. Data pertaining to the same regulated entity but stored in another regulatory program's database is not accessible, even though the user's system could technically determine its existence and location via the program cross-reference in the regulated entity master file. For example, with reference to FIG. 1, agency personnel responsible for the air pollution control program can view only data that is in the air-specific database 22. While logged onto their system, they cannot view data stored in the other program-specific databases 24–30, unless cross-database retrievals have been written for this purpose.

In a system according to the present invention, only one joint-usage file access screen is used, implemented as part of the joint-usage features 50, in the file access and creation features 57. All agency personnel use this shared tool to find and create data documents relating to work activities undertaken by any regulatory program. The joint-usage file access screen allows an air pollution specialist, for example, to rapidly find and display existing data relating to a particular air pollution permit, as with the prior art, but also to find and view (e.g., without update privileges) activity folders and documents relating to water pollution permits for the same regulated entity, or even for a water-regulated entity that has no air permit. Access is provided to data that is stored in program-specific data tables 51–55 as well as in the shared tables accessed by the joint-usage file access screen.

The file access mechanism 57 of the present invention provides enhanced support for the multimedia approach to regulated entity management, allowing easier creation of multi-program permits, for example. The prior art system was designed to produce program-specific permits. A multimedia permit can only be produced by known prior art systems when two or more program-specific permitting work activities and their associated data documents are produced by separate systems and then issued together under the same cover. The joint-usage file access interface 57 of the present invention, on the other hand, allows any user to create a work activity that is labeled, in effect, "Multimedia Permit". A single set of permit-related data documents is created within this activity "folder," accessible to all permit-writers who must collaborate on the joint permit. The system also allows production of separate single-program permits when appropriate, as in the prior art. Even in this case, however, the data documents for each permit may be viewed electronically by any authorized person in the agency.

The file access differences between a system according to the present invention and the prior art system illustrated in FIG. 1 can also be described using the document/folder metaphor used above with reference to the prior art conceptual file diagram illustrated in FIG. 2 and the conceptual file diagram for the present invention illustrated in FIG. 5. In the prior art system, activity-specific data pertaining to a regulated entity is stored, conceptually, in a separate one-drawer filing cabinet for each regulatory program with a "program interest" in that entity, such as Air Data for Regulated Entity X in filing cabinet 32 and Water Data for Regulated Entity X in filing cabinet 34. Air program personnel can view all data contained in the Air cabinet 32, or in the Air cabinet for any other entity regulated by the Air program, but cannot open the Water cabinet for Regulated Entity X or any other regulated entity.

Figure 10:
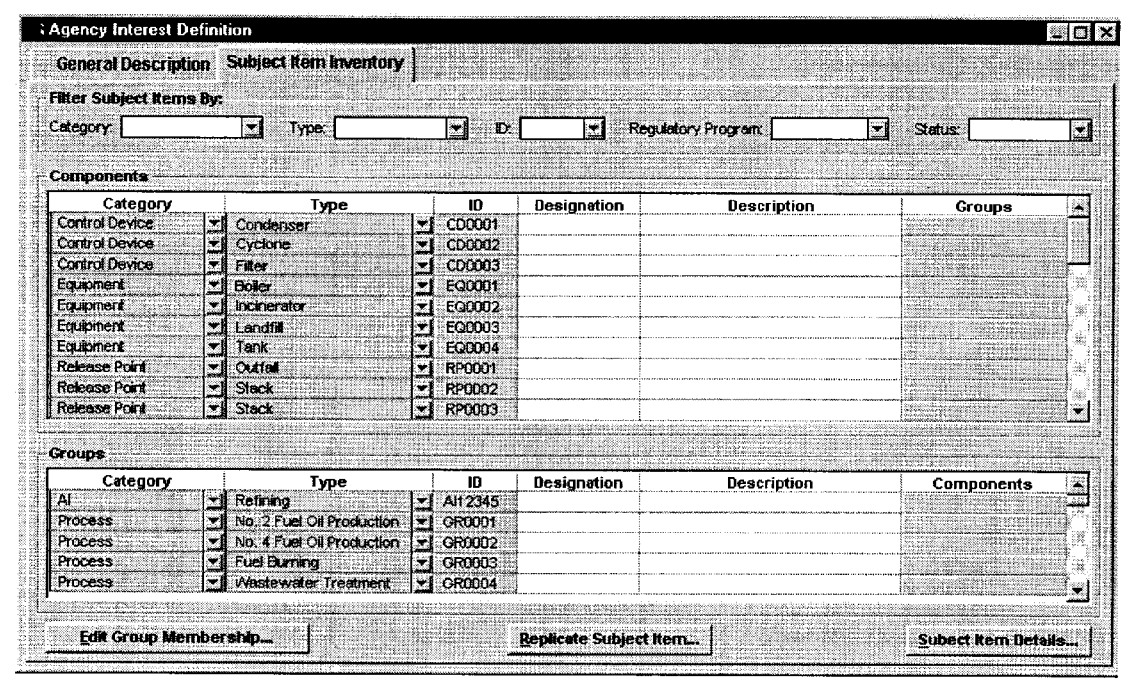

According to the present invention, all data pertaining to a regulated entity is contained, conceptually, in one filing cabinet for that regulated entity, such as Regulated Entity 1 in filing cabinet 56a and Regulated Entity 2 in filing cabinet 56b. Each work activity associated with a regulated entity is represented as a file folder in the cabinet. Using a display screen like that illustrated in FIG. 10 and the screen (not shown) accessed by the "Edit Group Membership . . . " button, the folders can be grouped by regulatory program area in program-specific drawers, as illustrated in FIG. 4, and there can also be a multimedia drawer. A user is easily able to view information in any of the file folders in any drawer of a regulated entity's filing cabinet. The user can also easily switch to any other regulated entity's filing cabinet.

Definition of Subject Items for a Regulated Entity

As noted earlier, a regulated entity's subject items are the specific objects, operations, or activities related to the regulated entity that are subject to regulatory requirements. Examples of subject items include: boilers and other kinds of equipment that produce air pollution; wastewater discharge pipes; waste-holding structures such as pits, ponds, tanks, and drum pads; solid waste landfills; and a wide variety of regulated activities that are behavioral and not physical in nature, such as hazardous waste generation, pesticide application, and underground fuel tank removal. In regulatory programs that issue permits, a list of a regulated entity's subject items is first entered into the database when an initial permit application is received describing each subject item using a screen like that illustrated in FIG. 10. The initial list may be altered or expanded by information contained on subsequent applications for permit modifications or renewals, or by other required submittals, as the regulated entity's physical plant and/or activities change. In regulatory programs that do not issue permits, such as a program regulating generation of hazardous wastes, the nature of the subject items is most often described in notification forms or registration forms filed by the regulated entity. For example, a registrant may declare that its operation qualifies for regulation as a "small quantity generator" of hazardous wastes, rather than a "large quantity generator," and thus is subject to the requirements on the former subject item type rather than the latter.

In the prior art system of regulated entity data management described above, each regulatory program maintains a database of subject item lists and descriptions in its program-specific system 22–30. The data is organized by regulated entity, and then by subject item type within regulated entity if multiple instances of a single subject item type are present (e.g., several coal-fired boilers at a power plant). Each regulatory program has one or more user interface screens for entry and modification of its subject item inventory, and, because of historical differences in the nature of permit applications among programs, these screens and the underlying data structures are dissimilar from program to program. As a result, when a regulated entity is subject to multiple regulatory programs, the data defining its regulated objects or activities is spread across multiple separate data systems. This is not a handicap for an agency that uses the traditional compartmentalized approach to regulation, in which each program works independently to impose and monitor the requirements for its area. However, if an agency wishes to take a holistic, multimedia approach to regulation, the distribution of a regulated entity's subject item data across multiple databases, typically in discrepant data formats, presents significant obstacles.

In a system according to the present invention, these obstacles are removed by consolidating the creation and maintenance of a regulated entity's subject item inventory into a single joint-usage capability 50, including the software programming code for one user interface screen and data tables containing data that may be displayed on the screen. A single software application is used by agency personnel in all program areas; there are no separately-accessed program-specific systems. The subject item component 58 includes a single subject item list, comprising all subject item types and instances, for each of the master regulated entities 56. The subject item list may be updated by any authorized person, regardless of program area. The basic descriptors of an individual subject item are standardized for all programs, including an identification number, type code, descriptive name, and start and end dates for its active existence.

It is still necessary, however, to capture descriptive details that are unique to a given subject item type and which may therefore be thought of as program-specific. For example, the data field "Percent Sulfur in Fuel" may be appropriate for a boiler whose air emissions are regulated but not for a wastewater outfall, for which a "Receiving Stream" field may be appropriate. In a system devised under the present invention, these specialized details are considered program-specific data that can be linked to the appropriate subject item inventory record that was defined, in general terms, in the joint-usage screen of the subject item inventory 58. In the data structure, the general definition of the subject item would be stored in a joint-usage data table of the subject item inventory, but "Receiving Stream," for example, would be identified as program-specific data. One way to clearly separate program-specific data is to store program-specific data in a separate table linked to the general table via a unique subject item identification number. The "Receiving Stream" data, for example, could be stored in an air-specific data table in air program module 51.

This arrangement has two distinct advantages for agencies that wish to take a multimedia approach to regulated entity management, such as producing a single multi-program permit for the entity instead of individual program-specific permits.

First, because a consolidated subject item inventory is maintained in a single data table, subject items that are regulated by multiple programs can be defined only once, with the relevant program-specific details linked to it. This approach averts the situation, common in the prior art approach, in which a single item, e.g., a storage tank, is given a different unique identifier in the air system 22 and the hazardous waste system 24, making it difficult for multimedia regulators to understand that it is in fact the very same tank and to treat it accordingly in a joint permit. Under the present invention, subject item basic descriptions are treated as master data, analogous to the basic identification information in the regulated entities table 56, to ensure that an individual item does not appear on the inventory more than once.

Second, the present invention provides much greater flexibility to permit writers in creating and imposing requirements in a multimedia permit for a regulated entity. This is accomplished via a mechanism on the joint-usage screen (FIG. 10) of subject item inventory 58 that allows grouping of individual subject items into "super-items," for purposes of placing requirements on the group, instead of or in addition to on the individual members of the group. In the prior art system, subject items could be grouped only within a program area. In a system under the present invention, subject items regulated by different program areas may be easily grouped together (by selecting the "Edit Group Membership . . . button illustrated in FIG. 10) so that the multi-program assemblage may be dealt with as a whole in the permit. For example, all of the air emission, wastewater, and hazardous waste subject items relating to a paint pigment production process can be grouped into a single subject item representing that process, which may be one of several industrial processes engaged in at a site or by a regulated entity. Then, in the multimedia permit for that regulated entity, requirements can be placed on the operation of the pigment production process as a whole, as well as on the program-specific components individually. In this way, the agency can impose requirements that encourage the permittee to reduce the total pollution risks of that production process, rather than shifting pollution from a heavily-restricted medium (e.g., air emissions) to a less-restricted medium (e.g., hazardous waste disposal), or into another process later in the production flow.

An important consequence of the joint-usage method of subject item definition just described is the disappearance of the "program interest" construct from the data structure. In the prior art, one or more program interests are defined as attribute data of a regulated entity master record, identifying which of the program-specific databases 22–30 contained program-specific data pertaining to that regulated entity. This cross-reference, established in the regulated entity master file system 20, served as the linchpin for cross-program data retrievals. A system according to the present invention, however, is designed to operate in a setting in which regulatory programs do not function independently of one another and instead collaborate on multimedia activities such as permitting and enforcement. In such a setting, compartmentalization of data along traditional programmatic lines is de-emphasized in favor of data structures that promote the flexible multimedia treatment described in the previous paragraph. In a system designed to support this new way of doing business, it suffices to relate subject items directly to a regulated entity rather than to a "program interest" representing a program-specific view of that regulated entity.

Preparation of Permits

Much of the work of environmental regulatory agencies centers around creation of permits—documents that enumerate to the parties responsible for regulated entity operations the specific requirements with which they are legally bound to comply. Each of the program-specific systems 22–28 developed for the prior art MPCA system incorporated software and data tables to facilitate permit development. An explanation of the differences between the prior art and the present invention in this area will be aided by the following summary of the general approach to automated permit preparation.

Systems according to both the prior art and the present invention are designed to store permit requirements as database records, composed of numerous discrete fields, so that they can be manipulated in useful ways that are not possible when requirements are created as strings of text in a word processing application, the method typically used in the absence of such a system. Permit documents are produced as database retrievals that array the requirement statements on printed pages in a fashion that is indistinguishable from word processor output.

The primary advantage of storing requirement statements as data fields rather than text passages is that a software routine can easily extract from the record the data that specifies a number or a date with which compliance is required and then electronically compare that data to other data representing the actual observed or reported situation. For example, a pollutant emission limit stated in a permit requirement can be machine-compared to pollution monitoring data obtained later to determine whether the parameter is within the allowable range. Similarly, the system can compare a due date for an action required of the permittee, such as submitting a quarterly report, to data entered later recording the receipt date of such items to determine whether the obligation was satisfied on time. These automated capabilities significantly reduce the amount of time that agency personnel must devote to compliance determination, one of the primary tasks of a regulatory agency.

Two important system features support the creation of permit requirements as database records rather than word processing text.

First, permit writers employ a set of user interface screens in permit preparation 59 to create individual requirement records used to generate a permit. Each requirement pertains to a single subject item. The system may use reference tables to organize the individual requirement records for output, or the user may be able to organize the resulting records in a desired sequence for printing. In the latter case, the interface allows the permit writer to create and display the requirements for one subject item at a time, and to switch the display from subject item to subject item until all requirements on all subject items have been defined and arranged.

Second, permitting specialists can pre-define standard sets of requirements that are normally applicable to a given subject item type. These standard requirement records, typically derived from published regulations, are stored in a data table identified in FIG. 4 as requirements library 60. Each requirement record in requirements library 60 contains, in addition to the fields that comprise the requirement statement itself, fields that specify the type of subject item to which the requirement applies, discussed further in the example below. Once the subject items to be covered by the permit have been defined, the system can automatically create a baseline permit by extracting the appropriate standard requirements from the data table in requirements library 60 and displaying them in the screen for permit preparation 59. The permit writer may then use the requirement creation tools included as part of permit preparation 59 to modify or delete any of the standard requirements or to craft specialized new requirements for which no standard exists in requirements library 60. The requirement records used in the permit are then stored in data tables that are separate from the requirements library table. This database of requirements used in permits 61 has many uses, including permit document printing, automated compliance determination, and inspection checklist generation which is discussed later.

The set of fields used to specify the type of subject items to which records in requirements library 60 apply are analogous to the call number of a library book. The following is an example of the cataloging scheme:

1.0.0.0: Air emission equipment
1.3.0.0: Air emission equipment, boiler
1.3.5.0: Air emission equipment, boiler, greater than 250,000 BTU
1.3.5.2: Air emission equipment, boiler, greater than 250,000 BTU, coal In this example, a requirement record that applies to all types of air emission equipment would be coded 1.0.0.0 in requirements library 60, where "1" signifies air emission equipment and other values would represent other categories. A requirement that applies to a type of air emission equipment called a boiler, not to all boilers regardless of their description, would be coded 1.3.0.0, where "3" signifies "boiler" as opposed to other equipment types. A requirement that applies only to boilers generating more than 250,000 BTU of heat output, regardless of the fuel type used, would be coded 1.3.5, where "5" signifies a capacity of over 250,000 BTU. A requirement that applies to boilers generating more than 250,000 BTU and fueled by coal would be coded 1.3.5.2, where "2" signifies coal as opposed to natural gas or other fuels that such a boiler might burn.

In order to be included in a permit for a regulated entity, a subject item must have been defined in the subject item inventory database 58, and its description must include a "call number"—in this case, 1.3.5.2. When the permit writer instructs the system to construct a draft permit by extracting standard requirements from the requirements library, the system would use the call number for that specific subject item to retrieve four sets of standard requirements: requirements applicable to air emission equipment in general (coded 1.0.0.0); air emission requirements applicable to boilers (coded 1.3.0.0); air emission requirements applicable to boilers in the 250,000+ capacity category (coded 1.3.5.0); and requirements applicable to boilers of that size that burn coal (coded 1.3.5.2). All of these requirements are potentially applicable to this specific subject item, and the four sets of requirements would be displayed together in the screen for permit preparation 59 as the list of standard requirements for that item.

The permit preparation capabilities 59 of a system according to the present invention differ from those of the prior art in two ways.

First, the user interface screens, processing routines, and data structures are implemented as part of joint-usage capabilities 50. A person constructing an air pollution permit uses the same software mechanisms as a person constructing a water pollution permit, and the data constituting each permit is stored in the same data tables. In the prior art, each permitting program had its own permit preparation software and data structures within its program-specific data system.

Second, a system according to the present invention allows integrated preparation of multimedia permits, i.e., documents that combine requirements from multiple regulatory programs. In the prior art, a multimedia permit could only be prepared by producing two separate permit documents, created using program specific systems 22–30, and then binding the printed output as a single document. The change in permitting capabilities is greatly facilitated by the use of a joint-usage subject item inventory 58. All permittable subject items in a regulated entity's inventory, provided in the permit application or previous permits are available for permit writer(s) to designate which, if any, requirements are to be excluded. The determination of whether to exclude requirements may be made based on information received from a permit applicant. Because a "call number" in requirements library 60 has been assigned already to each subject item, the system can automatically retrieve the applicable standard requirements from the library, regardless of the regulatory program that promulgated the requirement. If a subject item is regulated by more than one program (e.g., a trash incinerator that is subject to air pollution and solid waste management requirements), a call number for each program's requirements may be entered in the subject item's record, and the permit-drafting routine will extract all corresponding requirements from requirements library 60. This enables the present invention to output all requirements for the subject item together in the permit-creation screen and in the printed permit document, rather than in separate sections as must be the case in systems based on the prior art.

Preparation of Inspection Checklists

Site inspection is an important method of determining whether a regulated entity is complying with its permit requirements or with published regulations. Inspectors typically organize an inspection according to a checklist of the applicable requirements. A regulated entity data system according to the present invention can generate inspection checklists electronically by retrieving requirement records into a user interface screen, from which a checklist report may then be printed. For entities regulated by permits (involving "permitted activities"), the system constructs an inspection checklist by retrieving requirement records from the database of requirements used in permits 61, including any non-standard requirements the permit writer or applicant has added to the standard requirements. For entities not regulated by permits (involving "non-permitted activities"), the requirement records are extracted from the requirements library 60. In the latter case, the system uses the "call number" of each subject item defined for the regulated entity to look up the library requirements applicable to that type of activity, in the same manner used to create a draft permit, described in the previous section. In checklists for either permitted or non-permitted entities, the full text of requirements, which may be extensive, is not necessarily displayed on the checklist. Instead, the system can substitute "checklist language"—a paraphrase of the standard requirements from which the in-force requirement was derived, sufficient to remind an experienced inspector what to look for at the site. The checklist language is stored as a field in the requirements library record for each inspectable requirement.

The inspection checklist generation capabilities of a system according to the present invention differ from those of the prior art in two ways.

First, the user interface screens, processing routines, and data structures for inspection checklist preparation 62 are implemented as part of joint-usage capabilities 50. A person constructing an inspection checklist containing water permit requirements uses the same software mechanisms as a person constructing a checklist for hazardous waste generation, a non-permitted activity. All checklist requirements and inspection results are stored in the same set of data tables by inspection checklist 62. In the prior art, each regulatory program had its own inspection checklist preparation software and data structures within its program-specific data system.

Second, a system according to the present invention allows integrated preparation of multimedia inspection checklists, i.e., checklists that combine requirements from multiple regulatory programs. When the inspection is completed, the inspector records the results in the database by means of a single screen in inspection checklist 62. In the prior art, a multimedia checklist can only be prepared by producing separate checklists, using separate program-specific systems. The inspection results from each checklist must then be entered into the program-specific system that generated the checklist.

Preferably, in a system according to the present invention, the checklist-creation interface screen contains a mechanism for selectively including or excluding the requirements that apply to any subject item that has already been defined for the regulated entity in subject item inventory 58. Thus, the inspector may elect to include only the subject items regulated for water pollution, making the inspection a water-only inspection, or the inspector may elect to include both water and hazard waste generator subject items, making the inspection a multi-program inspection. An inspection also may be limited to inspecting requirements for a specific regulatory program through the definition of the activity category, class, and type for the specific inspection activity. When a subject item is regulated by more than one program, as with a landfill that is subject to both air and solid waste requirements, all of its applicable requirements will appear grouped together on the checklist, for the convenience of the inspector(s).

Recording of Data on Reported Quantities

Regulatory agencies require many of their regulated entities to submit periodic reports to the agency providing information on the nature and extent of their activities. In the case of environment regulatory agencies, the regulated entities report on pollutant releases to the environment, on-site storage and handling of chemicals that may pose a hazard, etc. For example, most wastewater dischargers are required to sample their effluent at least monthly, determine the concentration of all permitted parameters, and report these results to the agency. Some large plants are required to install monitoring systems that take air samples continuously, ana-lyze them, and record the results, and transmit this data to the regulatory agency's computer.

The chemical quantity information has several uses, including regulatory program planning, making the public aware of potential hazards, and monitoring of compliance with requirements in permits or published regulations. In the latter case, a regulated entity may be required to analyze samples of its waste streams and submit the results to the agency, where this data is then compared to the limits on chemical compounds and other parameters that have been defined in the regulated entity's permit(s).

Environmental agencies find it useful to capture the reported data on pollutants and other reported quantities into an electronic database. One important benefit is that the process of comparing the reported values to the allowable levels can then be automated, dramatically reducing the staff time that is devoted to determining compliance with permit limits or published standards. As described above, prior art systems implement a separate and distinct set of data entry and display capabilities in each program-specific data system. As a result, the reported data is stored in the program-specific databases making it difficult to get an overall view of a regulated entity's activities.

Another important use is computer-based analysis of pollution trends, e.g., for a regulated entity, a geographic area, or an industry sector. Increasingly, regulatory agencies are seeking methods of analyzing all of the pollutant releases from a single site, including air emissions, wastewater discharges, and land disposal of waste materials, so that they can develop a coordinated, multimedia approach to controlling the facility's total pollutant output.

A system according to the present invention handles reported quantity data differently than a system based on the prior art. Reported quantities capabilities 63, i.e., the user interface screens, processing routines, and data structures for entering and displaying reported quantity data, are implemented as part of joint-usage capabilities 50. A standard list of chemicals and other monitored parameters is used agency-wide, and the data entry screen in joint-usage reported quantities capabilities 63 can accommodate data received by any regulatory program.

Preparation of Enforcement Orders

A regulated entity's failure to comply with an applicable requirement is considered a violation. Violations may be discovered via inspections or via other compliance determination methods, such as comparing pollutant limits to actual monitoring results and comparing submittal due dates to receipt dates. In a regulated entity management system according to the present invention (as well as in the prior art MPCA system), a record of each individual violation is stored in violations listing 64, including data identifying the violated requirement, the discovery method and date, a description of the extent of the violation, and so on. The contents of the violations listing 64 can be displayed in a data screen, allowing agency enforcement staff to identify newly-discovered violations and decide whether an enforcement order is warranted.

To create an enforcement order requiring a regulated entity to correct violations, an enforcement officer first creates a data screen as part of enforcement order preparation 65 and then designates on the screen in violations listing 64 the specific violation(s) to be addressed. The system copies these violation records into data tables included as part of enforcement order preparation 65, and the violation data may then be viewed in the enforcement order preparation screen. The enforcement officer then adds descriptive information, enters the amount of the penalty to be assessed if appropriate, and defines one or more corrective actions to be required of the regulated entity. When this preparation is completed and internal approvals have been received, the enforcement order can be printed as a database report, data-merge document, or some other technique that produces a document merging data describing the violations, penalty, and corrective actions into a standard text template for the type of order being produced.

The violations listing 64 and enforcement order preparation capabilities 65 of a system according to the present invention differ from those of the prior art in two ways.

First, the user interface screens, processing routines, and data structures of violations listing 64 and enforcement order preparation 65 are implemented as part of joint-usage capabilities 50. An enforcement officer constructing an enforcement order addressing violations of air pollution requirements uses the same software mechanisms, accessing the same data tables, as an enforcement officer constructing an order addressing wastewater discharge violations. In the prior art, the regulatory programs had their own violations listing and enforcement order preparation software and data structures within the program-specific data systems 22–30.

Second, a system according to the present invention allows easy preparation of multimedia enforcement orders, i.e., documents that address violations of requirements from multiple regulatory programs. In the prior art, a multimedia enforcement order can only be prepared by producing separate orders, as word processing files, from two or more program-specific systems 22–30 and then merging these documents into one.

Preferably, in a system according to the present invention, a single table receives violation records from all compliance determinations performed by the agency. A joint-usage screen in violations listing 64 thus can display a regulated entity's violations for any and all regulatory programs. The enforcement officer may elect to address any of these violations in an enforcement order, by instructing the system to copy them into a screen in enforcement order preparation 65 that the user has created for this purpose. If air and solid waste violations are both included in this fashion, the resulting enforcement order will be multimedia in nature, i.e., addressing violations of requirements from multiple regulatory programs.

FIG. 6 is a block diagram illustrating a computer system on which the system illustrated in FIGS. 3 and 4 can be implemented. A database server 70 stores data included in the joint-usage capabilities 50 and program-specific features 51–55. Personal computers or workstations 72 executing client software and network file/application server(s) 74 include processors for executing the software included in the joint-usage capabilities 50 and program-specific features 51–55. In addition to the input devices in the personal computers and workstations 72, optical scanners, etc. in peripheral devices 76 and the remote connection server(s) 78 provide input units for inputting operational and other data. Printers included in the peripheral devices 76 may be used to print permits, enforcement actions and other reports. All of these components are preferably connected by a local or wide area network 80.

The present invention has been described primarily with respect to environmental regulation. However, as discussed above, the present invention is applicable to many types of regulation. Since environmental regulation is among the most complex types of regulation, a system according to the present invention that is used for other types of regulation may be much simpler. For example, there may not be many features that are program specific in other areas of regulation.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

| Reference Number List | |
|---|---|
| 20 | Regulated entity master file system |
| 22 | Air pollution control data system |
| 24 | A hazardous waste management data system |
| 26 | A solid waste management data system |
| 28 | A water pollution control data system |
| 30 | Other program-specific systems |
| 32 | "Air" filing cabinet |
| 34 | "Water" filing cabinet |
| 50 | Joint-usage capabilities |
| 51 | Air capabilities |
| 52 | Surface water capabilities |
| 53 | Hazardous waste capabilities |
| 54 | Solid waste capabilities |
| 55 | Other program(s) capabilities |

-continued

Reference Number List

| | |
|---|---|
| 56 | Regulated entities |
| 56a | Regulated entity 1 |
| 56b | Regulated entity 2 |
| 58 | Subject item component |
| 60 | Requirements library |
| 61 | Requirements used in permits |
| 62 | Inspection checklist preparation |
| 63 | Reported quantities |
| 64 | Violations listing |
| 65 | Enforcement order preparation |
| 70 | Database server |
| 72 | Personal computers |
| 74 | Network file server |
| 76 | Printers, optical scanners, and other peripherals |
| 78 | Remote connection server(s) |
| 80 | Local/wide area network |

What is claimed is:

1. A method of managing information on regulated entities, comprising:

creating a joint-usage database with a primary data level identifying the regulated entities, optionally associable with a geographic location, and a secondary data level identifying subject items of the regulated entities;

adding permit data to the joint-usage database, by referencing at least one of the subject items for one of the regulated entities for generating a permit for the at least one of the subject items;

adding operational performance data to the joint-usage database with reference to the at least one of the subject items for the one of the regulated entities, the operational performance data obtained from monitoring reports of operation of the at least one of the subject items; and accessing the joint-usage database when necessary to enforce the permit.

2. A method as recited in claim 1, wherein the information is maintained by a regulatory agency having jurisdiction over a plurality of program areas, and wherein said creating of the joint-usage database creates unique records for the regulated entities in the joint-usage database as unique for all of the program areas over which the regulatory agency has jurisdiction.

3. A method as recited in claim 1, wherein the information is maintained by an environmental regulatory agency, and wherein said creating of the joint-usage database creates for a single regulated entity multiple subject items identifying different environmental program areas regulating the single regulated entity.

4. A method as recited in claim 3, wherein the information in said primary data level identifies the regulated entities as one of a fixed operation having a single geographic location associated therewith;

an occurrence having a single geographic location associated therewith;

a mobile operation that changes geographic location periodically; and an organization responsible for transport of potentially hazardous materials, either in vehicles or conduits, across a geographic area.

5. A method as recited in claim 3, wherein said creating of the joint-usage database includes storing in each record at the secondary level one of a single subject item and a list of subject item identifiers for related subject items.

6. A method as recited in claim 5, wherein said creating of the list of subject item identifiers is performed at discretion of a user for any subject items regardless of the environmental program areas associated with the subject items identified by the subject item identifiers.

7. A method as recited in claim 3, further comprising creating program-specific tables, separately identifiable from and supplementing joint-usage data in the joint-usage database, wherein said creating of the joint-usage database creates unique records for the regulated entities regulated by the environmental regulatory agency, including records in all of the program-specific tables, and wherein said adding of the permit data and the operational data adds data to any of the program-specific tables only when the data is of a type not accommodated by the joint-usage database.

8. A method as recited in claim 1, wherein said creating of the database includes defining in the subject items, characteristics applicable to requirements for regulating the regulated entities, and wherein said method further comprises creating in the joint-usage database, separate from tables containing the information identifying the regulated entities and the subject items, a requirements library specifying the requirements for regulating the regulated entities, providing inspection checklist language corresponding to the requirements in fewer words, providing default descriptions of noncompliance for use when requirements are violated, and providing default corrective action requirements for use in enforcement orders addressing violations of requirements.

9. A method as recited in claim 1, wherein said adding permit data includes setting requirement data for the permit, and wherein said method further comprises preparing enforcement orders based on violations detected by comparing the operation performance data with the requirement data based on selection by a user for each enforcement order to include one of program-specific violations and multimedia violations of requirements from different regulatory programs.

10. A method for regulation of regulated entities, comprising:

maintaining information on the regulated entities, including a joint-usage database with the regulated entities at a primary data level and subject items of the regulated entities at a secondary data level;

generating a permit for at least one of the subject items of each of the regulated entities by accessing the joint-usage database;

obtaining operational data from monitoring operation of the subject items;

storing the operational data in the joint-usage database; and enforcing each permit based on the information stored in the joint-usage database.

11. A method as recited in claim 10, wherein said maintaining includes defining for the subject items characteristics applicable to requirements for regulating the regulated entities, and maintaining in the joint-usage database, a requirements library specifying requirements for regulating the regulated entities, and wherein said generating includes receiving a request from a user specifying the at least one subject item of a selected regulated entity to be covered by the permit, and automatically accessing the requirements library in response to the request from the user to determine the requirements applicable to the permit based on the characteristics of the at least one subject item.

12. A method as recited in claim 11, wherein said maintaining includes storing in each record in the secondary data level one of a single subject item and a list of subject item identifiers selected by a user from the subject items related to one of the regulated entities without any limitation to the characteristics of the subject items.

13. A method as recited in claim 12, wherein said maintaining of the requirements library includes maintaining checklist language corresponding to the requirements for operation of the subject items, and wherein said method further comprises generating inspection checklists using the checklist language stored in the requirements library.

14. A method as recited in claim 10, wherein the regulated entities are subject to regulation under a plurality of program areas, wherein said maintaining includes creating program-specific tables, separately identifiable from and supplementing joint-usage data in the joint-usage database, for each of the programs requiring additional data not included in the joint-usage data and of a type used by only one of the program areas, and wherein said generating of each permit is performed using joint-usage software accessing the joint-usage database supplemented, as needed, with information in the program-specific tables.

15. A method as recited in claim 14, wherein said generating includes receiving a request from a user specifying a selected regulated entity and a plurality of the subject items related thereto and corresponding to different program areas to be covered by the permit, and automatically producing a single permit in response to the request from the user to regulate operation of the subject items under all of the different program areas.

16. A method as recited in claim 10, wherein said method is performed by an environmental regulatory agency, wherein said obtaining includes obtaining the operational data on activities that have environmental impact, including pollutant releases, and wherein said storing includes storing the operational data describing violations of applicable requirements, including pollutant releases, in the joint-usage database.

17. A method of managing information on regulated entities, comprising:

maintaining a joint-usage database with a primary data level identifying the regulated entities, a secondary data level identifying subject items of the regulated entities and typical permit requirements for each of the subject items, the permit requirements for all subject items including permit requirements in a plurality of program areas;

displaying the typical permit requirements for all of the subject items of a selected regulated entity;

selecting permit data from among the typical permit requirements in response to user input received after said displaying;

generating a permit based on the permit data selected, whereby said method can generate any one of a multimedia permit, a program-specific permit and a custom permit excluding specified subject items.

18. A method of managing information on regulated entities, comprising:

maintaining a joint-usage database with a primary data level identifying the regulated entities, a secondary data level identifying subject items of the regulated entities and checklist language for typical permit requirements for each of the subject items, the checklist language for all subject items including checklist language for the typical permit requirements in a plurality of program areas;

displaying the checklist language for all of the subject items of a selected regulated entity;

selecting from among the checklist language in response to user input received after said displaying;

generating an inspection checklist based on said selecting of the checklist language, whereby the inspection checklist generated by said method can exclude the checklist language for any of the subject items, including limiting the inspection checklist to a single program area.

19. A system for regulation of regulated entities, comprising:

a memory unit to store information on the regulated entities, including a joint-usage database storing regulated entity identifiers at a primary data level, subject items of the regulated entities at a secondary data level and operational data of the subject items at a lower level below the secondary level;

a processor, coupled to said memory unit, to generate a permit for at least one of the subject items of each of the regulated entities by accessing the joint-usage database in said memory unit;

an input unit, coupled to said processor and said memory unit, to input the operational data obtained from monitoring operation of the subject items; and an output unit, coupled to said processor, to output the permit.

* * * * *